United States Patent [19]

Ichimura et al.

[11] Patent Number: 5,307,756
[45] Date of Patent: May 3, 1994

[54] ROTATING STRIKER BELL

[76] Inventors: Kyoji Ichimura; Motohisa Ishiwa; Kazuharu Seki, all of 46-25 Angyo Oaza, Kawaguchi Saitama, Japan

[21] Appl. No.: 74,389

[22] Filed: Jun. 10, 1993

[30] Foreign Application Priority Data

Jun. 12, 1992 [JP] Japan .............................. 4-047166[U]

[51] Int. Cl.⁵ .............................. B62J 3/00; G10K 1/08
[52] U.S. Cl. .................................... 116/166; 116/154
[58] Field of Search ............... 116/154, 166, 155, 157, 116/159, 148, 152, 166

[56] References Cited

U.S. PATENT DOCUMENTS 616,732 12/1898 Rockwell .................. 116/166 X

FOREIGN PATENT DOCUMENTS 1025529 4/1953 France .................. 116/154
405758 9/1943 Italy .................... 116/154
3-49110 10/1991 Japan.

Primary Examiner—Daniel M. Yasich
Attorney, Agent, or Firm—Rick Martin

[57] ABSTRACT

A bicycle bell has a finger actuated strike lever mounted on a rotating base. The rotating base can be rotated around the 360° periphery of the ringer. Thus, the bell can be quickly adjusted for various riders or for switching from the right to the left handlebar. Additionally the present invention allows the user to choose which finger to use as well as to accommodate other equipment such as bicycle levers, etc.

17 Claims, 6 Drawing Sheets

ROTATING STRIKER BELL

CROSS REFERENCE PATENTS

The present application was initially filed as Japanese Application No. 47,166 having a filing date of Jun. 12, 1992.

FIELD OF THE INVENTION

The present invention relates to bicycle bells which have a 360° adjustable finger actuated striker. The invention is especially suited for bicycles which are ridden by more than one person.

BACKGROUND OF THE INVENTION

One type of simple bell used on bicycles and tricycles uses a stationary ringer. The ringer is generally shaped like a downward facing hemisphere. A finger actuated strike lever projects outward from a mounting bracket beneath the ringer. A clapper is attached to the strike lever adjacent to the ringer. The operator need only snap the strike lever with his finger. This causes the strike lever and clapper assembly to hit the ringer, thereby sounding the bell. The disadvantage of this simple bell is that only one angle of the strike lever relative to the supporting handlebars is possible. Therefore, different riders having different finger lengths and/or different capabilities of finger movement cannot readily use the simple bell noted above. Additionally the present invention allows the user to choose which finger to use as well as to accommodate other equipment such as bicycle levers, etc. Furthermore, the same rider who sustains an injury to his usual bell finger cannot adjust the striker lever of the simple bell noted above. The same rider may also have difficulty obtaining the same comfortable operating angle of the striker lever when he moves the bell to a new bicycle.

Attempts have been made to improve the simple bell noted above. Japanese patent number 3-49110, patented Oct. 21, 1991 discloses two embodiments of an improved striker mechanism for a bicycle bell. The first embodiment teaches an outward projecting striker arm having a clapper inside the ringer. The striker arm can be activated in either the clockwise or counter-clockwise direction relative to the ringer. The second embodiment teaches a truly universal striker arm design. The striker arm is a rotating circular base which can be rotated 360° in either the clockwise or counter-clockwise direction relative to the ringer. This second embodiment, however, cannot be activated with a simple downward flick of the thumb. It requires a slightly more coordinated push motion on the periphery of the striker arm rotating circular base to actuate the ringer. Thus, this second embodiment is not universally convenient for children or adults who have any number of coordination handicaps. Furthermore, rain could cause the rider's finger to inadvertently slip off the rotating cylinder base.

The present invention improves on the simple bell noted above whose striker arm is activated by a downward flick of the finger. The improvement provides a 360° rotatable base for the outward projecting striker arm. The base can be manually adjusted to the desired angle by merely pushing it to any desired angle. This can be accomplished by a child even after the bell has been permanently secured to the handlebars. Thus, the simplest up-down striker arm/clapper design is now improved to immediately adapt to all riders.

SUMMARY OF THE INVENTION

The main object of the present invention is to provide an improved up-down striker arm/clapper assembly on a bicycle bell. The improved striker arm/clapper assembly rotates on a base to enable positioning the striker arm/clapper assembly at any point 360° relative to a central ringer.

Another object of the present invention is to provide the above noted improvement with a minimum number of manufacturing parts.

Other objects of this invention will appear from the following description and appended claims, reference being had to the accompanying drawings forming a part of this specification wherein like reference characters designate corresponding parts in the several views.

In the preferred embodiment a vertical support shaft is affixed to a handlebar mount. Surrounding the base of the support shaft atop the handlebar mount is a circular contacting surface having an upward projecting meshing tooth.

A rotating disk has a bottom contacting surface fitting flushly against the circular contacting surface and rotating around the support shaft. The bottom contacting surface of the rotating disk has a plurality of meshing holes arranged in a circle. Thus, rotating the rotating disk slips the upward projecting meshing tooth alternately around the plurality of meshing holes.

The striker arm/clapper assembly is affixed to the rotating disk. Therefore, the rotating disk becomes the rotating base of the striker arm/clapper assembly.

The support shaft has a spiral spring around it. A conventional ringer is attached to the top of the support shaft. The ringer compresses the spiral spring downward against the rotating base of the striker arm/clapper assembly. This spring pressure keeps the rotating base firmly engaged atop the circular contacting surface of the handlebar mount.

In operation the striker arm/clapper assembly can be manually rotated 360° to any desired location around the ringer.

Consequently when the bell is switched from the right handlebar to the left, the rider can quickly adjust the striker arm/clapper assembly to the desired position. Additionally the present invention allows the user to choose which finger to use as well as to accommodate other equipment such as bicycle levers, etc. Also the only significant manufacturing cost increase is the provision for the rotating base. Thus, cost increases have been minimized, and manufacturing is easy and inexpensive.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

Figure 1:
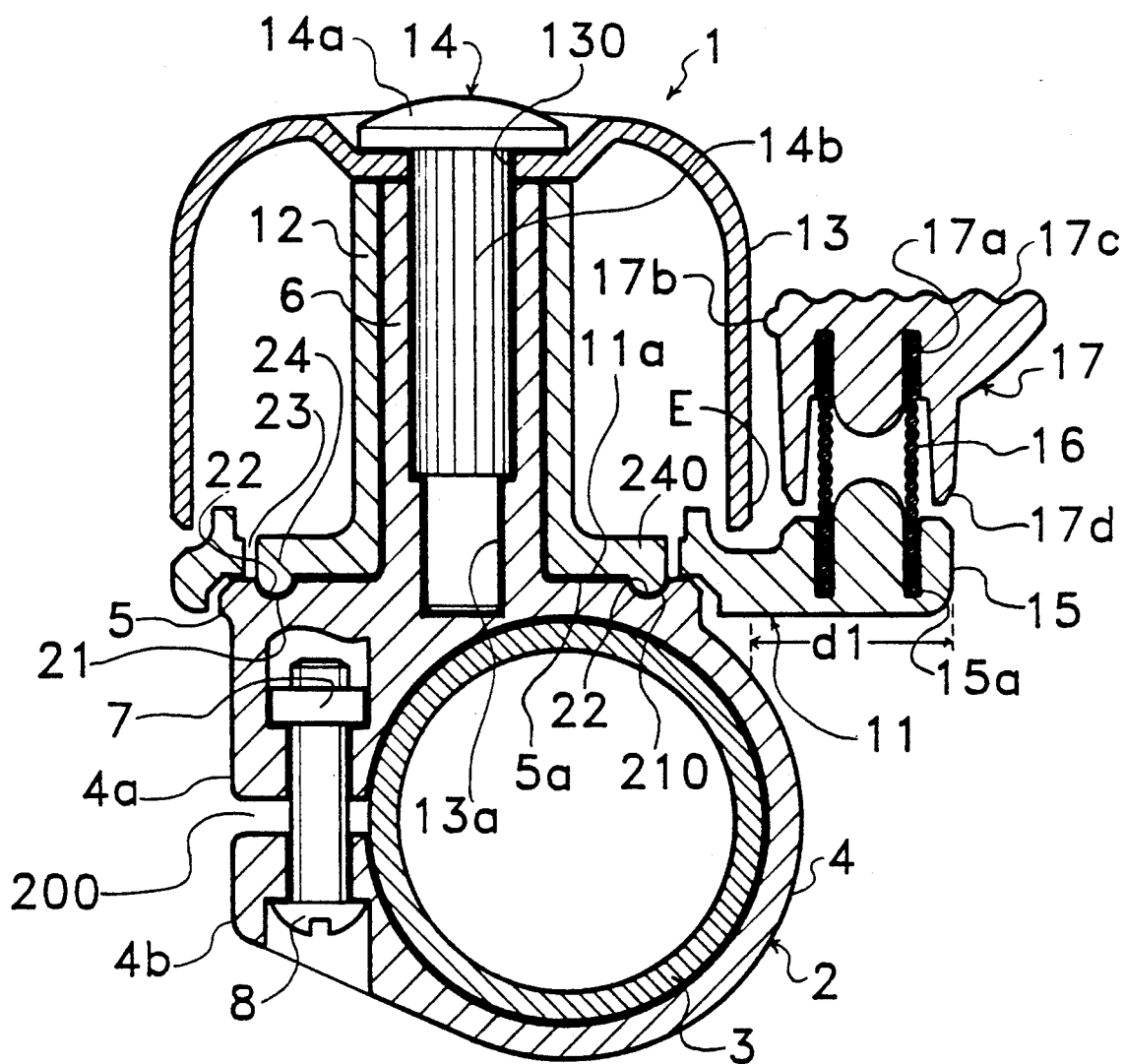
FIG. 1 is a cross sectional view of a bell mounted on a handlebar.
Figure 2:
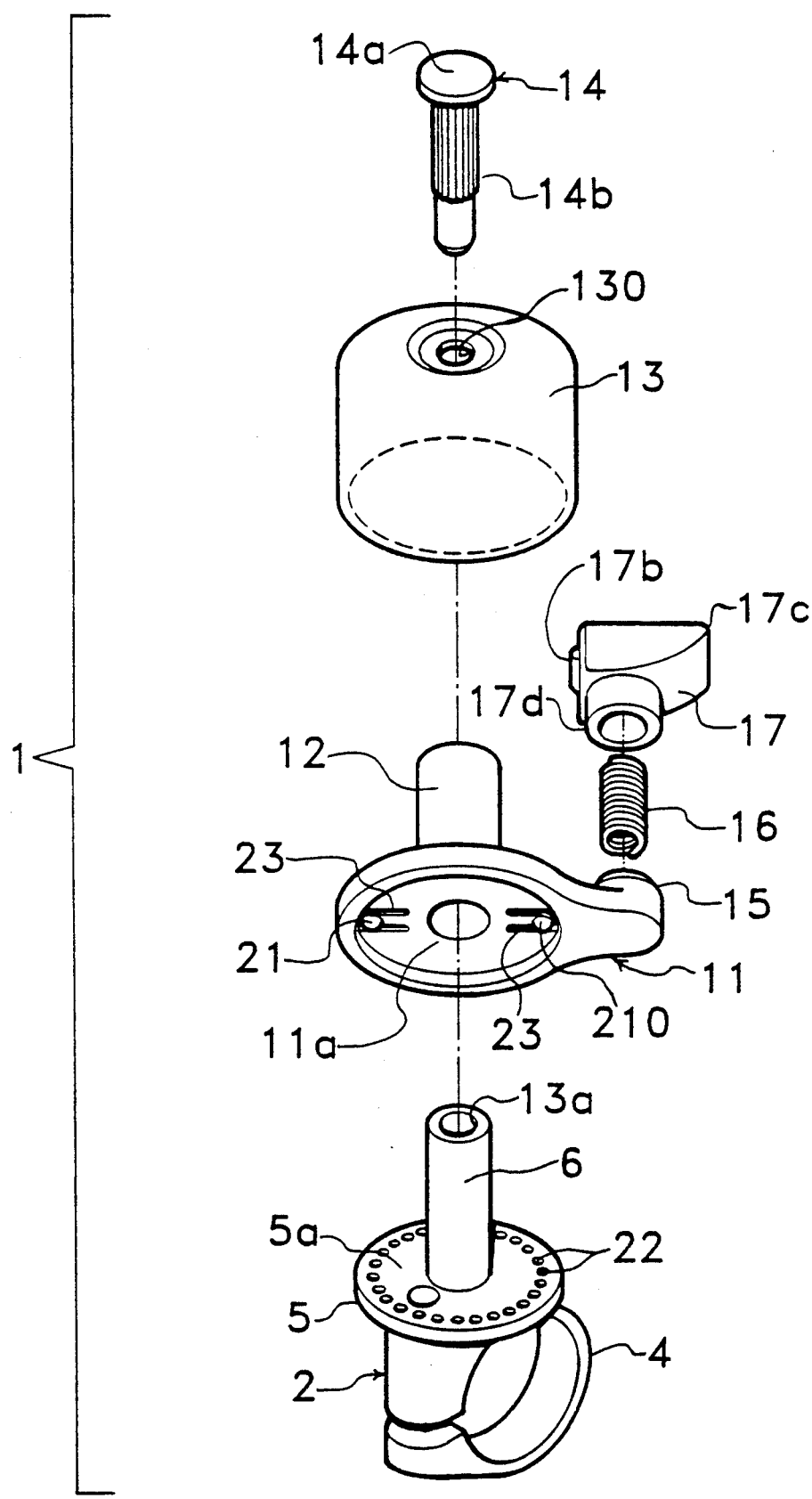
FIG. 2 is an exploded view of the bell shown in FIG. 1.

Referring first to FIGS. 1, 2 the bell 1 is attached to the bicycle handlebar 3 by means of a mounting bracket 2. The mounting bracket 2 forms a single unit having integral components. These integral components are the grip 4 which clamps on and connects to the handlebar. A disk 5 is established on the top part of the grip 4. A hollow support shaft 6 projects vertically from the center of the disk 5. It would be a matter of design choice (not shown) to design the grip and support shaft as separate members.

The grip 4 is split at intersection 200, thereby forming ends 4a, 4b which face each other. End 4a is inlaid with a nut 7. End 4b holds the head of a bolt 8. The grip 4 is affixed in a known manner to the handlebar 3 by meshing the threads (not shown) of bolt 8 with the threads (not shown) of nut 7.

A rotating base 11 is flat and circular and has a vertical sleeve 12. The vertical sleeve 12 is installed on the support shaft 6. The contact surface 5a of the mounting bracket 2 rotates freely with the contact surface 11a of the bottom of the rotating base 11.

The sleeve 12 is essentially the same height as the support shaft 6. A ringer 13 is attached to the upper end of support shaft 6 by means of a rivet 14 passing through hole 130. The rivet 14 has a circular head 14a and a shaft 14b. The shaft 14b extends downward for the head 14a and is press fitted into the hole 13a of the support shaft 6. Thus, the rotating base 11 can be rotated around the support shaft 6. The mounting bracket 2 and the rotating base 11 are preferably manufactured out of a synthetic resin material.

The ringer 13 is removably attached to the upper part of the support shaft 6 by means of the head 14a of the rivet 14.

In addition an arm 15 projects distally away from the support shaft 6 of the rotating base 11. The arm 15 projects distally a distance d1 from the outside edge E of the ringer 13. Cylindrical grooves 15a are formed in the upper side of the arm 15. One end of a coiled spring 16 is pressed into and affixed inside the grooves 15a. The coiled spring 16 is parallel to the support shaft 6. The top portion of coiled spring 16 is pressed into and affixed inside the cylindrical grooves 17a formed in the lower face of the strike lever 17.

The strike lever 17 is, therefore, spring pivoted atop the arm 15. In operation the presser 17c of the strike lever 17 is depressed and released by the operator's finger (not shown). This forces the clapper 17b against the ringer 13, thereby sounding the bell 1.

The cylindrical member 17d forms the base of the strike lever 17. When the presser 17c is pressed down by the operator's finger (not shown), the presser 17c is shifted away from the central axis of the coiled spring 16. Thus, when the presser 17c is released the restorative force of the coiled spring 16 causes the clapper 17b to strike the ringer 13.

Design choices (not shown) would include a rod type spring or a flexible piece(s) of synthetic resin in place of coiled spring 16.

It is necessary to provide a means to secure the rotating base 11 in its manually pre-set position. In FIGS. 1, 2 a pair of meshing protrusions 21,210 are formed on the contacting surface 11a of the rotating base 11. The protrusions 21,210 are formed on flexible prongs 24, 240 which are surrounded by cut-out slits 23.

The meshing protrusions 21, 210 engage in the plurality of indentations 22 formed on the contact surface 5a of the mounting bracket 2. The plurality of indentations 22 form a circular track. Thus, the rotational position of the arm 125 is secured by the meshing of protrusions 21, 210 into indentations 22. Obviously, it is a matter of design choice (not shown) if there exists only one protrusion 21 or more than two.

Figure 3:
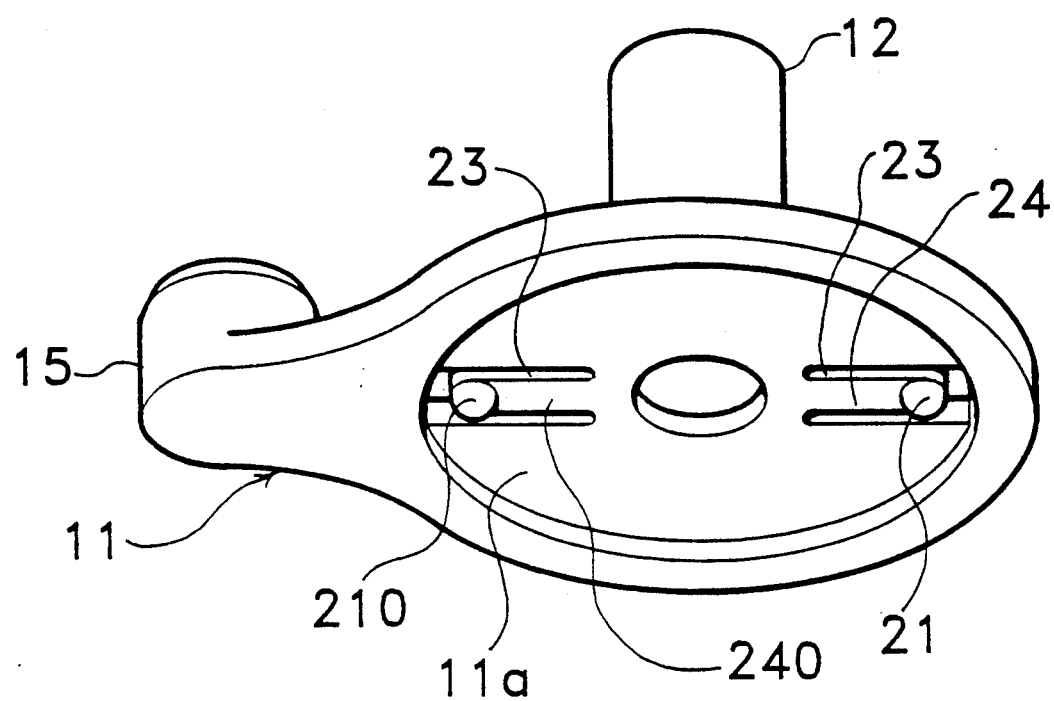
FIG. 3 is a bottom perspective view of the rotating base 11 shown in FIGS. 1, 2.

Referring next to FIGS. 2, 3 the slits 23 are formed on the rotating base 11 perpendicular to the support shaft 6. The protrusions 21, 210 are formed on the flexible prongs 24 which are formed by the slits 23. As a result, due to the bending action of the flexible prongs 24, the protrusions 21, 210 can be shifted around the central axis of support shaft 6 from one indentation 22 to the next.

In the embodiment shown in FIGS. 1, 2, 3 the operator grasps the arm 15 and rotates it around the support shaft 6 to the desired position. The flexible prongs 24, 240 allow the meshing protrusions 21, 210 to slip along the circular track of indentations 22. When the arm 15 reaches the desired direction, then the flexible prongs 24, 240 exert enough tension to secure the meshing protrusions 21, 210 in the indentations 22.

Figure 4:
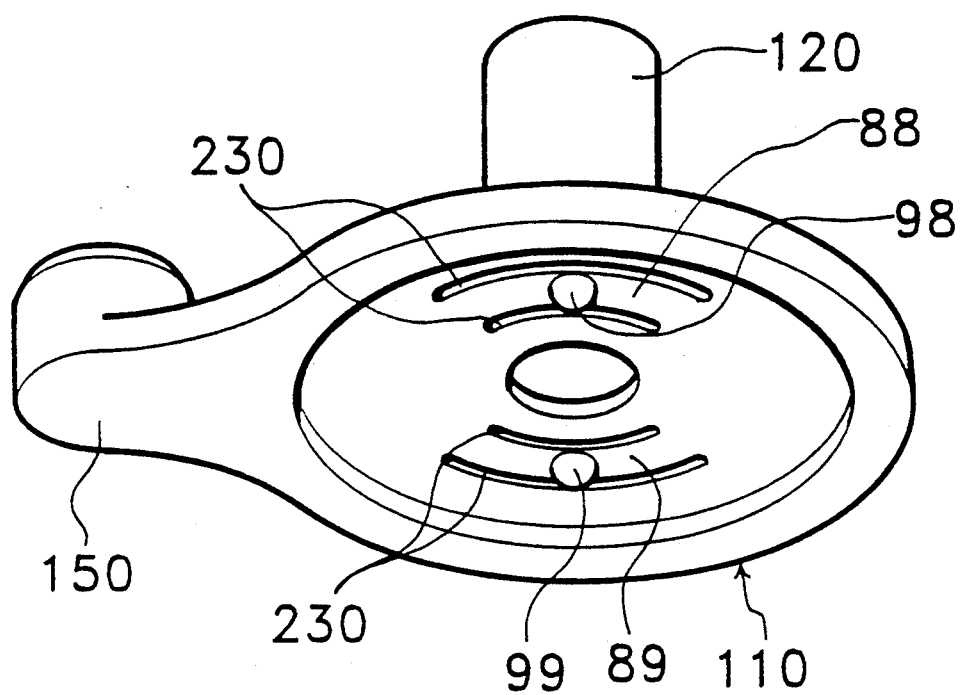
FIG. 4 is a bottom perspective view of an alternate embodiment of a rotating base.

Referring next to FIG. 4 an alternate embodiment having rotating base 110 is shown. The arm 150 and vertical sleeve 120 are identical to their corresponding parts in FIGS. 1, 2, 3. However, the slits 230 are not perpendicular to the vertical sleeve 120, but are disposed axially therefrom forming concentric circles. The meshing protrusions 98, 99 are formed on flexible members 88, 89. This embodiment provides the identical functionality as the embodiment of FIGS. 1, 2, 3.

Figure 5:
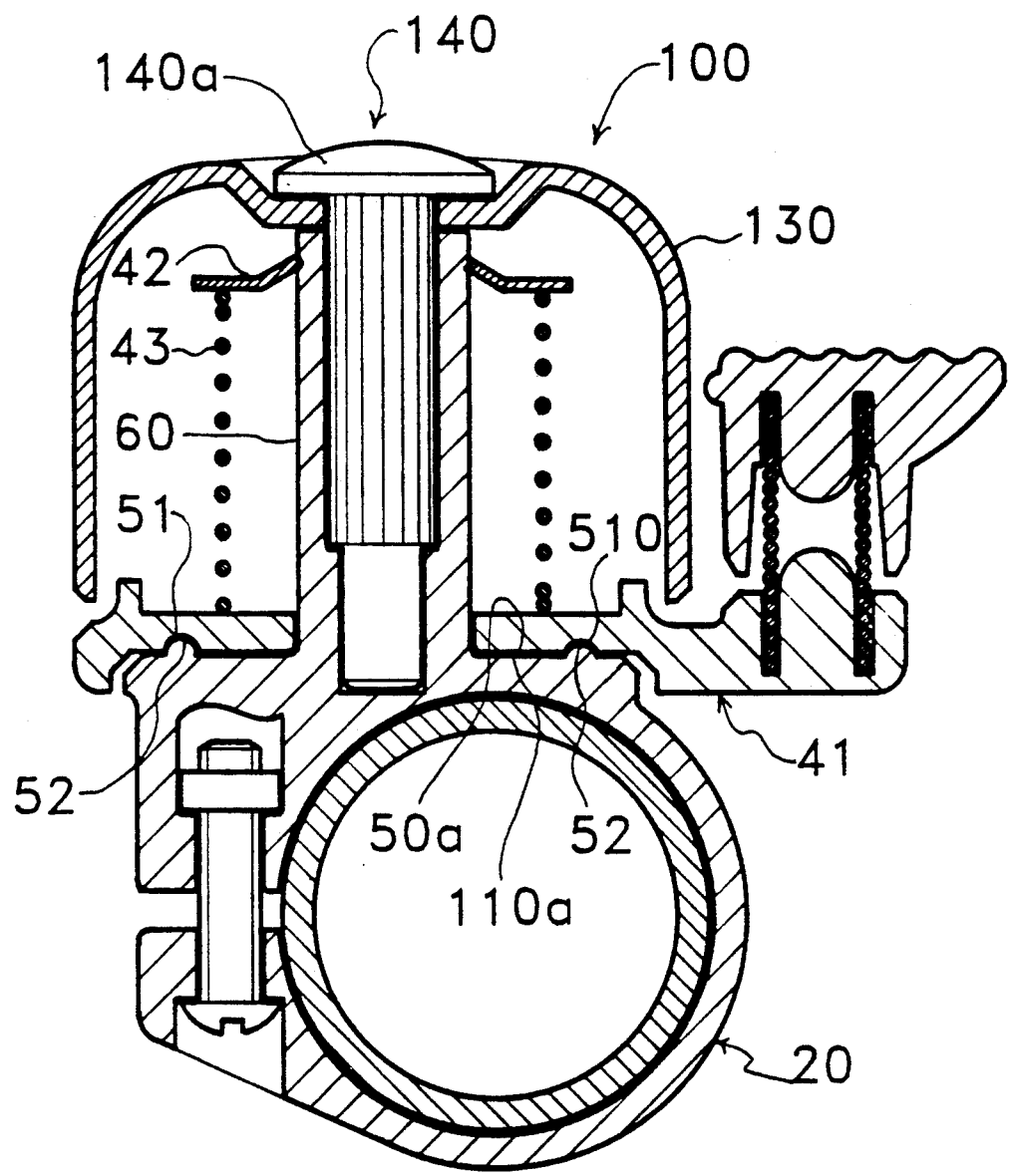
FIG. 5 is a cross sectional view of an alternate embodiment of the bell.

Referring next to FIG. 5 a bell 100 functions identically to the embodiment of FIGS. 1, 2, 3. However, the vertical sleeve 12 of FIGS. 1, 2, 3 has been replaced with a coiled spring 43 which is held in position by retainer 42. The retainer 42 is secured to the support shaft 60. Thus, the rotating base 41 is held against the mounting bracket 20 by means of the coiled spring 43. The mounting bracket 20 is similar to the mounting bracket 2 of FIGS. 1, 2, 3. However, the meshing protrusions 51, 510 are formed on the top surface of contact surface 50a of the mounting bracket 20. Indentations 52 are formed on the contact surface 110a of the rotating base 41. This is the reverse design of the meshing protrusions and indentations of FIGS. 1, 2, 3. The rest of the embodiment of FIG. 5 is identical to the embodiment of FIGS. 1, 2, 3.

In operation the rotating base 41 moves up and down due to the meshing protrusions 51, 510 and the restorative force of coiled spring 43.

It is a matter of design choice to have only one meshing protrusion 51. It is also a matter of design choice (not shown) to omit retainer 42, thereby allowing the coiled spring 43 to set directly against the inner face of ringer 130. In this case if the ringer 130 becomes loose between the top of the support shaft 60 and the head 140a of the rivet 140, then the coiled spring 43 will prevent the ringer 130 from rattling.

Figure 6:
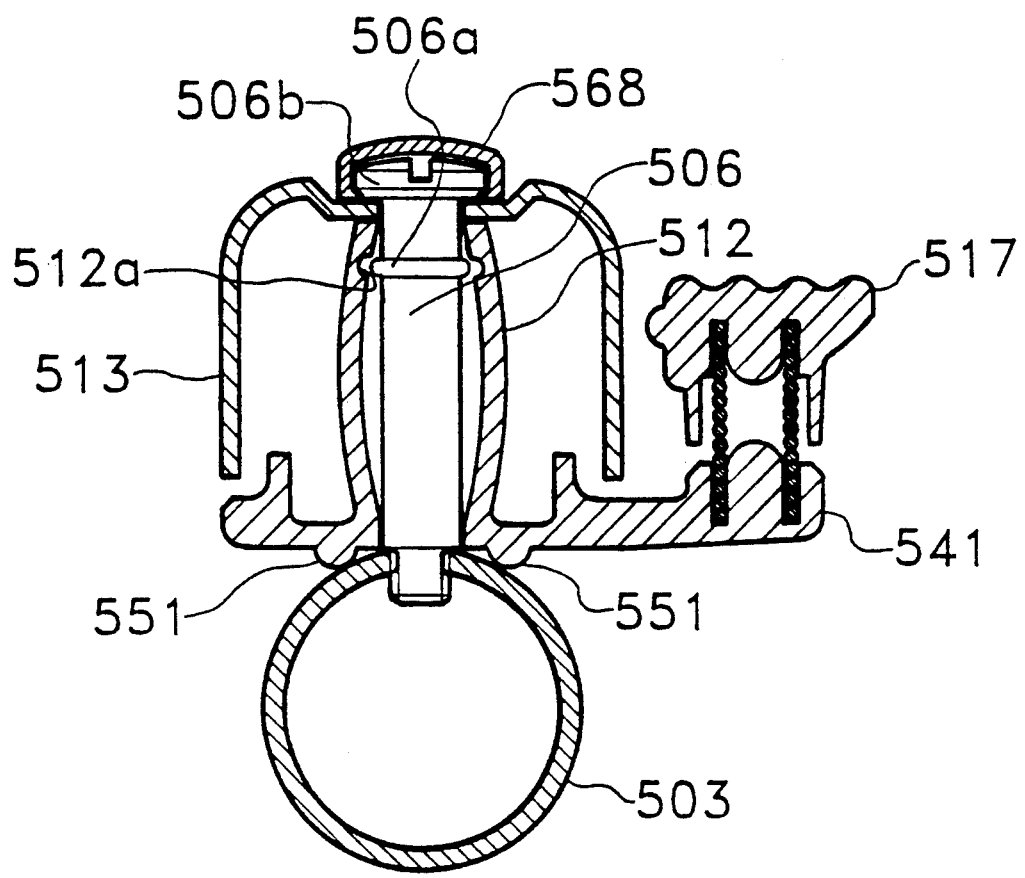
FIG. 6 is a cross sectional view of an alternate embodiment of the bell.

Referring next to FIG. 6 still yet another embodiment is shown containing the spirit of the present invention. A support shaft 506 comprises a bolt which is screwed directly into the handlebar 503.

A rotating base 541 has a strike lever 517 and a vertical sleeve 512. The vertical sleeve 512 rotates freely around support shaft 506. Rotational stability is achieved between these two members by means of circular groove(s) 512a on the inner face of vertical sleeve 512 and a ring shaped protrusion(s) 506a formed in the upper end of the support shaft 506. The top of the support shaft 506 is covered by a cover 568.

In addition the ringer 513 is interposed between the head 506b of the support shaft 506 and the top of the vertical sleeve 512. The elasticity of the vertical sleeve 512 acting as a spring causes the plurality of protrusions 551 to press directly against the handlebar 503. The bottom surface of the rotating base 541 is circular. The protrusions 551 form a circular pattern on the bottom of the rotating base 541. The desired angle of the rotating base 541 is secured by the protrusions 551 pushing directly against the handlebar 503 by means of the elastic pressure exerted by the vertical sleeve 512 acting as a spring. A design choice (not shown) includes a spring pushing down on the top of the vertical sleeve 512.

In summary all of the above embodiments enable the strike lever to be positioned anywhere around the 360° periphery of the ringer without the use of any tools.

KEY

1 Bell
2 Mounting bracket
3 Bicycle handlebar
4 Grip
4a End
4b End
5 Disk
5a Contact surface of mounting bracket
6 Support shaft
7 Nut
8 Bolt
11 Rotating base
11a Contact surface of bottom of the rotating base
12 Vertical sleeve
13 Ringer
13a Hole
14 Rivet
14a Circular head
14b Shaft
15 Arm
15a Cylindrical grooves
16 Coiled spring
17 Strike lever
17a Cylindrical grooves
17b Clapper
17c Presser
17d Cylindrical member
20 Mounting bracket
21 Meshing tooth
21,210
22 Indentations
22 Meshing hole
23 Slit
24,240 Flexible prongs
41 Rotating base
42 Retainer
43 Coiled spring
50a Contact spring
51,510 Meshing protrusions
52 indentations
60 Support shaft
88,89 Flexible members
98,99 Meshing protrusions
100 Bell
110 Rotating base
110a Contact surface
120 Vertical sleeve
130 Hole
130 Ringer
140 Rivet
140a Rivet head
150 Arm
230 Slits
503 Handlebar
506 Support shaft
506a Ring shaped protrusion
506b Head
512 Vertical sleeve
512a Circular groove
513 Ringer
517 Strike lever
541 Rotating base
551 Protrusion
568 Cover Although the present invention has been described with reference to preferred embodiments, numerous modifications and variations can be made and still the result will come within the scope of the invention. No limitation with respect to the specific embodiments disclosed herein is intended or should be inferred. Obviously the present invention is suited for use on any number of vehicles including but not limited to baby carriages, wheelchairs, and motorized carts.

I claim:

1. A bell for mounting on the handlebars of a bicycle or tricycle, comprising:
    a ringer;
    a mounting bracket secured to the handlebars;
    said mounting bracket further comprising a top having a contact surface, and a support shaft projecting upward from the contact surface;
    attachment means for attaching the ringer atop the support shaft;
    a rotating base;
    said rotating base further comprising a bottom contact surface slidingly engaged with the mounting bracket contact surface, a vertical sleeve rotatably mounted on said support shaft, securing means to hold the rotating base in position, and a distally projecting arm having striker lever means functioning to ring the ringer when depressed and released; and
    said rotating base further comprising rotational adjustment to any one of a plurality of rotational positions 360° relative to the support shaft.

2. The bell of claim 1 wherein said attachment means further comprises a hole in the center of the support shaft, and rivet means passing through a hole in the ringer and the hole in the support shaft.

3. The bell of claim 1 wherein said securing means to hold the rotating base in position further comprises a meshing protrusion on said mounting bracket contact surface slidingly engaged with a plurality of indentations on the rotating base contact surface, and spring means to push the meshing projection releasably into said indentations.

4. The bell of claim 3 wherein said spring means further comprises flexible members formed on the mounting bracket contact surface by slits therein.

5. The bell of claim 1 wherein said securing means to hold the rotating base in position further comprises a meshing protrusion on said rotating base contact surface slidingly engaged with a plurality of indentations on the mounting bracket contact surface, and spring means to push the meshing projection releasably into said indentations.

6. The bell of claim 5 wherein said spring means further comprises flexible members formed on the rotating base contact surface by slits therein.

7. The bell of claim 1 wherein said striker lever means further comprises spring means supporting a striker having a presser for a finger and a clapper for ringing the ringer.

8. The bell of claim 7 wherein said spring means further comprises a coiled spring.

9. A bell for mounting on the handlebars of a bicycle or tricycle, comprising:
  a mounting bracket secured to the handlebars;
  said mounting bracket further comprising a top having a contact surface, and a support shaft projecting upward from the contact surface;
  attachment means for attaching the ringer atop the support shaft;
  a rotating base;
  said rotating base further comprising a bottom contact surface slidingly engaged with the mounting bracket contact surface, securing means to hold the rotating base in position, and a distally projecting arm having striker lever means functioning to ring the ringer when depressed and released; and
  said rotating base further comprising rotational adjustment to any one of a plurality of rotational positions 360° relative to the support shaft.

10. The bell of claim 9 wherein said attachment means further comprises a hole in the center of the support shaft, and a rivet passing through a hole in the ringer and the hole in the support shaft.

11. The bell of claim 9 wherein said securing means to hold the rotating base in position further comprises a meshing protrusion on said mounting bracket contact surface slidingly engaged with a plurality of indentations on the rotating base contact surface, and spring means to push the meshing projection releasably into said indentations.

12. The bell of claim 11 wherein said spring means further comprises a coil spring between said ringer and said rotating base.

13. The bell of claim 9 wherein said striker lever means further comprises spring means supporting a striker having a presser for a finger and a clapper for ringing the ringer.

14. The bell of claim 13 wherein said spring means further comprises a coiled spring.

15. A bell for mounting on the handlebars of a bicycle or a tricycle, comprising:
  a ringer;
  a hole on top of the handlebars;
  a rotational base;
  said rotating base further comprising a bottom contact surface having protrusions slidingly engaged with the handlebars over the hole therein, a vertical sleeve having a central mounting hole, spring means, and a distally projecting arm having striker lever means for ringing the ringer;
  a bolt means passing through a hole in said ringer and said vertical sleeve central mounting hole and secured into said hole on top of said handlebars; and
  said rotating base further comprising rotational adjustment to any one of a plurality of rotational positional 360° relative to the support shaft.

16. The bell of claim 15 wherein the spring means further comprise an elastic vertical sleeve.

17. A bell of claim 15 wherein said spring means further comprise a coil spring between said ringer and said rotating base.

* * * * *